(12) United States Patent
Tamir

(10) Patent No.: US 11,046,839 B2
(45) Date of Patent: Jun. 29, 2021

(54) PLASTIC COMPOSITIONS

(71) Applicant: UBQ Materials Ltd., Petah-Tikvah (IL)

(72) Inventor: Yuval Tamir, Moshav Avichail (IL)

(73) Assignee: UBQ Materials Ltd., Petah-Tikvah (IL)

( * ) Notice: Subject to any disclaimer, the term of this patent is extended or adjusted under 35 U.S.C. 154(b) by 24 days.

(21) Appl. No.: 16/277,269

(22) Filed: Feb. 15, 2019

(65) Prior Publication Data

US 2020/0263005 A1  Aug. 20, 2020

Related U.S. Application Data

(63) Continuation of application No. 15/641,682, filed on Jul. 5, 2017, now Pat. No. 10,246,578, which is a continuation of application No. 13/810,076, filed as application No. PCT/IL2011/000562 on Jul. 14, 2011, now abandoned.

(60) Provisional application No. 61/364,182, filed on Jul. 14, 2010.

(51) Int. Cl.
| | |
|---|---|
| *C08L 17/00* | (2006.01) |
| *C04B 26/26* | (2006.01) |
| *C04B 18/30* | (2006.01) |
| *C04B 18/22* | (2006.01) |
| *C04B 111/00* | (2006.01) |

(52) U.S. Cl.
CPC .............. *C08L 17/00* (2013.01); *C04B 18/22* (2013.01); *C04B 18/30* (2013.01); *C04B 26/26* (2013.01); *C04B 2111/0075* (2013.01); *C08L 2205/025* (2013.01); *C08L 2205/03* (2013.01); *C08L 2207/04* (2013.01); *C08L 2312/00* (2013.01)

(58) Field of Classification Search
CPC ........... C08L 2207/20–24; C08L 17/00; C08L 19/003; C04B 18/24–28
See application file for complete search history.

(56) References Cited

U.S. PATENT DOCUMENTS

| | | | |
|---|---|---|---|
| 3,468,974 | A | 9/1969 | Elgin |
| 6,169,128 | B1 | 1/2001 | Vivaudou |
| 6,558,773 | B2 | 5/2003 | Edson |
| 6,703,440 | B2 | 3/2004 | Edson |
| 2001/0056155 | A1 | 12/2001 | Edson |
| 2002/0113333 | A1* | 8/2002 | Liu ............... C08L 23/0815 264/83 |
| 2003/0198775 | A1 | 10/2003 | Roth et al. |
| 2005/0279965 | A1 | 12/2005 | Arrison et al. |
| 2007/0272775 | A1 | 11/2007 | Szilvassy |
| 2007/0283861 | A1 | 12/2007 | Zanotta |
| 2009/0163665 | A1 | 6/2009 | Ellul |

FOREIGN PATENT DOCUMENTS

| | | |
|---|---|---|
| CN | 1228102 A | 9/1999 |
| CN | 102348514 A | 2/2012 |
| JP | 4-227095 A | 8/1992 |
| JP | 7 026492 A | 1/1995 |
| JP | H0782581 A | 3/1995 |
| JP | H07314445 A | 12/1995 |
| JP | H10146827 A | 6/1998 |
| JP | H11226956 A | 8/1999 |
| JP | 2003-165900 A | 6/2003 |
| JP | 2009-196868 A | 9/2009 |
| KR | 960004 356 B1 | 4/1996 |
| KR | 100101490 B1 | 4/1996 |
| KR | 1001014900000 | 7/1996 |
| WO | 2004/074594 A1 | 9/2004 |
| WO | 2005/073307 A1 | 8/2005 |
| WO | 2005/093019 A1 | 10/2005 |
| WO | 2006/035441 A2 | 4/2006 |
| WO | 2007/049136 A2 | 5/2007 |
| WO | 2009/019684 A2 | 2/2009 |
| WO | 2010/079495 A1 | 7/2010 |

OTHER PUBLICATIONS

Spitz et al., "Survey and Examination Thermal Treatment of Municipal Solid Waste and Comparison of Alternatives for Thermal Treatment of Scrap Tires", Final Report: Ministry of the Environment, Grant 8-300, Mar. 2010.
International Search Report and Written Opinion from International Application No. PCT/IL2011/000562 dated Nov. 28, 2011.

* cited by examiner

*Primary Examiner* — Ana L. Woodward
(74) *Attorney, Agent, or Firm* — Greenberg Traurig, LLP

(57) ABSTRACT

The subject matter discloses a plastic composition comprising a first component and a second component, the first component comprising an organic element and a thermoplastic element and the second component comprising cross-linked hydrocarbon elastomers. The subject matter further discloses a process comprising mixing while heating under shear forces a first component comprising organic material and thermoplastic material with a second component comprising cross-linked hydrocarbon elastomers; to obtain a melt; processing the melt, the processing comprises at least cooling the melt to obtain a plastic composition comprising: organic element; thermoplastic element; and at least one cross-linked hydrocarbon elastomer element.

6 Claims, No Drawings

PLASTIC COMPOSITIONS

RELATED APPLICATIONS

This application is a continuation of U.S. Pat. No. 10,246,578, filed on Jul. 5, 2017, which is a continuation of U.S. patent application Ser. No. 13/810,076 filed on May 28, 2013, now abandoned, which is a national phase filing under 35 U.S.C. 371 of International Application No. PCT/IL2011/000562, filed on Jul. 14, 2011, which claims the benefit of U.S. Provisional Application No. 61/364,182, filed on Jul. 14, 2010.

BACKGROUND ART

Approximately 280 million tires are discarded each year in the United States, only 30 million of which are retreaded or reused, leaving roughly 250 million scrap tires to be managed annually. Besides the need to manage these scraps tires, it has been estimated that there may be as many as 2 to 3 billion tires that have accumulated over the years and are contained in numerous stockpiles. The continuously rising prices of natural rubber provide an economic driving force to the environmental motivation to recycling scrap tires.

A typical scrapped automobile tire weighs 9.1 kg. Roughly 5.4-5.9 kg (13 lb) consists of recoverable rubber, composed of 35 percent natural rubber and 65 percent synthetic rubber. A typical truck tire weighs 18.2 kg and also contains from 60 to 70 percent recoverable rubber. Truck tires typically contain 65 percent natural rubber and 35 percent synthetic rubber. The majority of modern tires are steel-belted radials, containing 10-15% metals and 10% cords (e.g. polyester, nylon or rayon).

Approximately 45 percent of the 250 million tires generated annually are disposed of in landfills, stockpiles, or illegal dumps. About 7 percent are exported to foreign countries, 8 percent are recycled into new products, and roughly 40 percent are used as tire-derived fuel, either in whole or chipped form. Currently, the largest single use for scrap tires is as a fuel in various industries. At least 9 million scrap tires are processed into ground rubber annually. Ground tire rubber is used in rubber products (such as floor mats, carpet padding, and vehicle mud guards), plastic products and as a fine aggregate addition (dry process) in asphalt friction courses. Crumb rubber has been used as an asphalt binder modifier (wet process) in hot mix asphalt pavements.

The tire rubber waste is divided into categories defined by their size and method of production, i.e. slit tires, shredded tires or chipped tires, ground rubber and crumb rubber.

Rubber recycling process begins with shredding. After most of the steel and reinforcing cords are removed, a secondary grinding takes place, and the resulting rubber powder is ready for product remanufacture. The manufacturing applications that can utilize this inert material are restricted to those which do not require its devulcanization. In the rubber recycling process, devulcanization begins with cleavage of the sulfur-sulfur bonds which cross-linked the vulcanized rubber molecules, thereby facilitating the formation of new cross-linkages. Two main rubber recycling processes have been developed: the modified oil process and the water-oil process. With each of these processes, oil and a reclaiming agent are added to the reclaimed rubber powder, which is subjected to high temperature and pressure for a long period (5-12 hours) in special equipment and also requires extensive mechanical post-processing. The reclaimed rubber from these processes has altered properties and is unsuitable for use in many products, including tires. Typically, these various devulcanization processes have failed to result in significant devulcanization, have failed to achieve consistent quality, or have been prohibitively expensive.

Currently, tire reinforcing fiber (or tire cords) has very few uses in recycling and poses another significant problem in tire recycling industries. A rare example for a method for recycling tire cords is provided by U.S. Pat. No. 3,468,974 which teaches a molding composition containing 64-91% tire cord (polyamide) and 3-36% vulcanized rubber which is produced from extrusion pelletizing tire cord material. On the other hand production of products made of rubber originated from tires requires a step of devulcanization of the rubber. For example, in WO 2009/019684 there is disclosed a method for manufacturing a polymeric plastic product from used mineral oils, waste of hydrolysis of vegetable oils and/or animal fats as well as scrap automobile and/or other tires and/or other rubber waste.

Mixing Plastic with vulcanized rubber is known to recycle vulcanized rubber. For example, U.S. Pat. Application No. 2001/0056155 provides compression moldings from a mixture of ultra-low density polyethylene and a filer which may comprise recycled rubber.

U.S. Pat. Application No. 2005/0279965 describes a method for producing a composite material comprising mixing crumb rubber from recycled tires, plastic and asphalt in a high shear mixer.

U.S. Pat. Nos. 6,558,773 and 6,703,440 disclose a compression molding product made by blending and heating together rubber and a binder (e.g. ultra low density polyethylene) and extruding the blend followed by compression molding into a desired product.

U.S. Pat. No. 6,169,128 teaches a method for processing discarded plastic and rubber with a binder to obtain a processable material and useful products therefrom.

WO 2004/074594 teaches a panel for roofing or siding applications preferably made of a blend of rubber tire and drums.

SUMMARY OF THE INVENTION

The subject matter discloses a composite material comprising a first component and a second component, the first component comprising an organic element and a thermoplastic element and the second component comprising at least one element selected from the group consisting of vulcanized rubber and tire cords.

The subject matter further discloses a process comprising:
mixing while heating under shear forces a first component comprising organic waste and thermoplastic waste with a second component comprising at least one element selected from the group consisting of vulcanized rubber and tire cords; to obtain a melt;
processing the melt, the processing comprises at least cooling the melt to obtain a composite material comprising: organic element; thermoplastic element; and at least one element selected from the group consisting of vulcanized rubber and tire cords.

The subject matter further discloses a process comprising:
subjecting at least organic waste and thermoplastic waste to at least one processing step selected from the group consisting of drying, particulating, mixing and heating under shear forces, to obtain a first component;
mixing while heating under shear forces the first component with a second component comprising an element selected from the group consisting of vulcanized rubber and tire cords, to obtain a melt; and processing the melt, where the processing comprises at least cooling to obtain a composite material comprising organic element, thermoplastic element and at least one element selected from the group consisting of vulcanized rubber and tire cords.

DETAILED DESCRIPTION OF THE INVENTION

The following description is provided so as to enable any person skilled in the art to make use of the invention and the examples provided are representative of techniques employed by the inventors in carrying out aspects of the present invention. It should be appreciated that while these techniques are exemplary of preferred embodiments for the practice of the invention, those of skill in the art, in light of the present disclosure, will recognize that numerous modifications can be made without departing from the spirit and intended scope of the invention.

In the following, all indication of percentage (%) relate to the relative amounts of components in w/w units, namely weight of a component in 100 units of weight of the composite material. The relative amount may be determined in the final product or may be determined in the starting material(s), used to produce the composite material, before the described processing or in samples taken during processing before obtaining the resulting final, composite material. As will be appreciated, there may be some (typically small) variation between the relative amount of a component in an intake material (e.g. the first and/or second components) before it is processed and the obtained composite material due to a loss of matter such as moisture or other volatiles, the formation of some volatile compounds during processing, decomposition of materials and other factors that should be taken into account when comparing the content of a component in the composite material and that in an intake material.

All amounts or measures indicated below with the term "about" followed by a number should be understood as signifying the indicated number with a possible tolerance between approximately 10% above the indicated number and 10% below that number. For example, the term "about 10%" should be understood as encompassing the range of 9% to 11%; the terms about 100° C. denotes a range of 90° C. to 110° C. In this connection, it is noted that when referring to weight % it is meant the respective relative % content (w/w) on a total dry basis, with water excluded. Further, it is noted that the singular forms "a", "an" and "the" include plural referents unless the content clearly dictates otherwise.

Throughout this specification and the claims which follow, unless the context requires otherwise, the term "comprise", and variations such as "comprises" and "comprising", will be understood to imply the inclusion of a stated element or step or group of elements or steps but not the exclusion of any element or step or group of elements and steps. In this connection, the term "consisting essentially of" is used to define composite materials which include the recited elements but exclude other elements that may have an essential significance on the processing or resulting product. "Consisting of" shall thus mean excluding more than trace elements of other elements. Embodiments defined by each of these transition terms are within the scope of this invention.

The present invention is aimed, inter alia, at providing, on the one hand, a solution for vulcanized rubber and tire waste material including tire cords and on the other hand, for unsorted waste, such as domestic waste. The solution is provided by processing a combination of the above to obtain a compacted composite material. The present disclosure thus provides a composite material made from the aforesaid waste material, a method of processing the waste material into a useful composite material, and articles of manufacture from the waste-derived composite material.

In the following description and claims use will be made, at times, with a variety of terms, and the meaning of such terms as they should be construed in accordance with the invention is as follows:

"organic waste" is used herein to denote, without being limited thereto, any carbon including waste that was or is living, such as garden waste (leaves, grass clippings, branches, hay, flowers, sawdust, woodchips and bark), food waste (fruit, vegetables, grains, meat, egg shells, bones, oil, fat, or dairy products) as well as others (paper, feces, dust, hair, wood ash). Since the composite material comprises organic material it inherently comprises fingerprints that are unique to materials of biological origin e.g. DNA, proteins, chlorophyll, potassium, nitrogen and phosphorous etc., which are absent from materials of synthetic origin. The organic waste typically includes organic fibers.

"organic element" is used herein to denote any carbon-based material originating from organic waste. The organic element may be a combination of various organic elements originally forming organic waste and it may be organic waste that following processing according to the invention underwent some modification (chemical and/or physical) into a different form of chemical material (i.e. that was not originally present in the organic waste).

"organic fiber" is used herein to denote fibers of organic or man-made origin. In some embodiments, the organic fiber includes any one of cellulose, hemicellulose and/or lignin and combinations of same, the latter also known by the term "lignocellulosic biomass". Other types of organic fibers may be encompassed by this term, including other types of cellulose and cellulose derivatives, and fibrous proteins, such as wool and silk.

"thermoplastic waste" or "thermoplastic" is used herein to denote solid or essentially solid material that turn upon heating above a melting temperature into a hot flowable material (soft, malleable, moldable, remoldable and, extrudable, weldable material) and reversibly solidify into an elastic state when cooled back below its melting temperature. Upon further cooling below the glass temperature, the thermoplastic adopts a solid state, typically amorphous. Thermoplastics include, without being limited thereto, polyolefins, polystyrene, polyvinylchloride, polyethylene terephthalate, polyacrylonitrile, polybutadiene, polystyrene, polycarbonate, nylon, polyurethane, co-polymers thereof and other material having a thermoplastic property as defined above.

"thermoplastic element" is used herein to denote a plastic material that exhibits thermoplastic properties.

"substantially unsorted waste" or "SUW" is used herein to denote waste material, including, solid, semi-solid and/or fluid material, which may include plant material, result from human and animal activities, may originate from municipal waste, industrial waste (e.g. chemicals, paints, plastics, sand), agricultural waste (e.g. farm animal manure, crop residues), sludge, and may be waste including hazardous material, etc. The waste may be decomposable combustible waste, such as paper, wood, fabric or non-combustible waste, such as metal, glass, sand and ceramics. The waste may also originate from landfills including old landfills. The waste is either unsorted, e.g. obtained as is, i.e. in the form it is received at a waste management facility or at a waste dump or from a landfill; or the waste is partially sorted, i.e. from which one or more elements are selectively removed before processing, albeit, the majority of the waste is retained as is. Such selectively removed elements may have an economical value as recyclable materials or articles, and may include, without being limited thereto, metal parts, e.g. batteries, aluminum and iron, glass, ceramics, paper, cardboard and plastic containers such as bottles, storage bowls, commercial plastic ready to cook containers etc. When referring to majority of waste retained, it is meant that at least about 80% by weight of the original waste material (i.e. of the unsorted, as is, waste) and at times above 90% and even 95% by weight of the original waste material is retained. In other words, the elements that are removed from the waste does not exceed about 20%, about 10% or even about 5% of the weight of the original waste.

"municipal solid waste" or "MSW" is used herein to denote residential and/or commercial waste that is discarded by humans and industry. The MSW may be composed wood, wood derived products such as paper, cardboard, tissues and the like, food scraps and plastics. In 2007 the Environmental Protection Agency reported in the United States that MSW was composed of the following ingredients, as percent by weight: paper (32.7%), glass (5.3%), metals (8.2%), plastics (12.1%), rubber, leather and textiles (7.6%), wood (5.6%), yard trimmings (12.8%), food scraps (12.5%), other (3.2%). Israel reported a similar analysis for 2005: organic matter (40%), plastic (13%, predominately thermoplastics), cardboard (8%), paper (17%), textiles (4%) disposable diapers (5%), other (7%), glass (3%) and metals (3%). These percentages are averages and actual percentages will vary from location to location, but it is clear that the predominant components in these wastes are plastics and cellulosic type materials, e.g. wood and components derived from wood, e.g. paper, tissues, paperboard, etc. The MSW usually contains moisture.

The waste, in some embodiments SUW, may be used in accordance with the invention as a wet material (namely, including water and/or moisture) or is used as dry material (i.e., comprising less than 0.1% w/w moisture).

"Drying" is used to denote the treatment of waste or any of the elements of the composite material so as to remove therefrom liquids. Typically, the removal is of at least some amount of volatile liquids (i.e. liquids having a vapor pressure of at least 15 mmHg at 20 □C, e.g. water and ethanol). Drying results in a dried waste or element, namely, waste comprising not more than 10% moisture, not more than 5% moisture, and at times even not more than 1% moisture. In some embodiments, some level (e.g. above 1%) of liquid (e.g. water) in the waste is maintained after drying. The amount of liquid removed from the waste can be controlled to fit the intended use of the eventually obtained composite material. Further, drying encompass any means of drying, e.g. by placing the waste outdoors and allowing it to dry, under a stream of dry air, in an oven chamber or by squeezing the liquid out. In the context of the present invention, drying includes removal of at least 50% of the moisture, at times 60%, 70%, 80%, 90%, 95% and even, at times, up to 99% of the moisture initially contained in the waste or the element (this may be determined by weighting the waste or the element before and after drying). It is noted that 99-100% percent of the moisture does not have to be removed from the waste and in some applications it is even preferred that some water remains in the waste for the subsequent procedure for preparing the composite material or for the processing of the waste with the rubber and/or tire cords. In some embodiments, the waste obtained after drying and used for preparing composite material as disclosed herein has water and optionally other volatile liquids such as ethanol, at content in the range of about 1% and about 11%.

"vulcanized rubber" is used herein to denote cross-linked rubber polymers. The rubber polymers are typically hydrocarbon elastomers, such as polyisoprene (either natural rubber e.g. gum rubber or synthetic rubber) and styrene-butadiene rubber (SBR). The cross-linking typically includes reaction of the rubber polymer with sulfur, peroxides or any other cross linking agent known to those versed in the art, during which individual polymer chains are covalently interlinked to each other to yield a three dimensional matrix. The vulcanization of the rubber polymers gradually transforms the elastomers into thermosets. The degree of vulcanization may vary from one rubber to the other, depending on the application of the vulcanized rubber. It is to be understood that any vulcanized rubber at any degree of vulcanization may be used. It should also be noted that the vulcanized rubber may comprise a portion of non-vulcanized or devulcanized rubber, especially when the source of vulcanized rubber is rubber residues and discarded vulcanized rubber from rubber manufacturing plants. Typically, non-vulcanized or devulcanized rubber would not exceed more than 10% or even 5% or even as low as 1% of the total weight of the vulcanized rubber mass. The vulcanized rubber may also comprise rubber additives such as fillers and fibers including residues or contaminants to which the rubber was exposed to during vulcanization reaction, during its use, or processing (e.g. retreading, recycling treatment or size reduction into crumb rubber).

The vulcanized rubber may be less than 100% pure and may comprise small amounts of other residues in an amount of between 0.1 and 20% w/w of the total weight of the vulcanized rubber, at times the vulcanized rubber comprises between 0.5 and 10% w/w residues, or between 1 and 5% w/w residues. These residues include tire cords, steel, silica, anti-tackifying agents, oil, sand, iron, ash, and calcium carbonate.

In some embodiments, the "vulcanized rubber" is vulcanized rubber from disposed vulcanized rubber products such as, without being limited thereto, used tires, bumpers, shoe soles, latex and rubber gloves, conveyor belts and may also arrive from industrial rubber residues and discarded vulcanized rubber from rubber manufacturing plants. The latter may comprise some partially or non-vulcanized rubber as a minor component. In some other embodiments, the vulcanized rubber originates from virgin material, either natural or synthetic.

The discarded vulcanized rubber products (e.g. the tire waste) are grinded into any kind of particulated form of rubber known in the art such as scrap, shreds slits chips, ground rubber and crumb rubber.

In some embodiments, the term "vulcanized rubber" may be any component of tire waste, including, without being limited thereto, whole tire (the tread and the casing), or different forms of processing (sizing and shaping) of tire including tire slit, tire chips, ground rubber, crumb rubber, tire shreds, tire powder, tire cords etc.

In most cases the production of tire shreds or tire chips involves primary and secondary shredding by tire shredders. The discarded tires also undergo a size reduction process to typically obtain tire shreds, tire chips, ground rubber or crumb rubber. Similarly, when other sources of vulcanized rubber are used, these are also reduced by size to obtain processable particles.

"Tire" is to be understood as having its conventional meaning. Tires are predominantly of vulcanized rubber, tire cords and steel. Other constituents may include carbon, minerals (e.g. zinc and sulfur). According to the Technical Guidelines on Identification and Management of Used Tires, UNEP, Basal convention, 1999 on average tires comprise 45-47% rubber, 21-22% carbon, 16-25% steel, about 5% tire cords, 1-2% zinc, about 1% sulfur and 5-8% additives. Therefore, all of these components may be present in tires waste as used herein.

"Tire shreds" is used to denote tire particulates that are irregularly shaped and vary in size, with size varying from 300 to 460 mm long by 100 to 230 mm as wide, down to as small as 100 to 150 mm in length. The size and shape may be controlled by the process of their preparation, the manufacturer instructions/equipment and condition. Typically, during the process of shredding tires, internal steel belt fragments along the edges of the tire shreds are exposed. The steel belt fragments are typically removed from the tire shreds prior to processing according to the invention. In some embodiments, the steel belt fragments are removed by a magnetic separator, gravimetric separation techniques, Eddy Current Separator System and any other commonly used separation techniques.

"Tire chips" are used herein to denote processed tire shreds that typically have a size from 76 mm down to 13 mm.

"Ground rubber" is used herein to denote rubber sized from 19 mm down to 0.15 mm (No. 100 sieve) depending, inter alia, on the type of size reduction equipment and the intended application. The production of ground rubber may be achieved by granulators, hammer mills, or fine grinding machines. Granulators typically produce particles that are regularly shaped and cubical with a comparatively low-surface area. At times, fiberglass belts or cords are separated from the fine rubber powder, usually by an air separator. Ground rubber may be subjected to a dual cycle of magnetic separation, then screened and recovered in various size fractions.

"Crumb rubber" is used herein to denote rubber sized from 4.75 mm (No. 4 sieve) down to less than 0.075 mm (No. 200 sieve). Any common method that is used to convert scrap tires to crumb rubber may be applied such as the crackermill process, the granulator process and the micro-mill process. The crackermill process, wherein scrap tires is passed between rotating corrugated steel drums, generates irregularly shaped torn particles rendering a large surface area. These crumbs range in size from approximately 4.75 mm to 0.5 mm (No. 4 to No. 40 sieve) and are commonly referred to as ground crumb rubber. The granulator process is used to obtain granulated crumb rubber particles, by shearing apart the rubber with revolving steel plates that pass at close tolerance. Fine ground crumb rubber in the size range from 0.5 mm (No. 40 sieve) to as small as 0.075 mm (No. 200 sieve) are obtained by a micro-mill process. Cryogenic techniques may also be used, wherein the rubber particles are brought in contact with liquid nitrogen making the particles brittle and easy to shatter into small particles. This technique is often used before final grinding.

"Tire cords" which is used interchangeably with the term "tire fibers" denotes a high strength (high modulus) fibrous filamentary material having a relatively low degree of shrinkage and exhibits a low degree of hysteresis. Tire cords are used as reinforcement filaments which provide tires better resistance to compression fatigue for rubber products. The tire cords, while referring to tires, may be derived also from rubber conveyor belts, agricultural and plumbing rubber hosing etc. Tire cords may include, without being limited thereto, polyester (e.g. polyethylene terephthalate, PET), polyamide (nylon), aromatic polyamide (e.g. aramid and p-aramid) rayon, cotton, carbon fibers or any other material used in tire/belting industry. Other sources for the tire cords are virgin materials i.e. materials such as fibers made of rayon, nylon and polyesters, that were not derived from a used product, and fibers that are equivalent to tire cords from the textile industry or textiles such as old cloths or synthetic carpets.

Composite Material

In line with the above, the present disclosure provides a composite material comprising a first component and a second component, the first component comprising an organic element and a thermoplastic element and the second component comprising at least one element selected from the group consisting of vulcanized rubber and tire cords.

The first component comprises at least an organic element and a thermoplastic element.

In one embodiment, the organic element is in a range from at least about 10% (w/w) of the total composite material, at times, about 15% w/w, about 20% w/w, about 25% w/w, about 30% w/w, about 35% w/w, about 40% w/w and even at least about 48% w/w out of the total weight of the composite material to an upper % w/w of up to about 49% w/w, typically less than about 45% w/w, about 40% w/w, about 35% w/w or even less than about 30% w/w of organic matter.

The first component also comprises a thermoplastic element. In some embodiments, the amount of the thermoplastic element is in a range from at least 1% w/w, 2% w/w, 5% w/w or even 10% w/w of the total composite material to an upper % w/w of up to about 49% w/w, typically less than about 45% w/w, about 40% w/w, about 35% w/w or even less than about 30% w/w of thermoplastic element of the total composite material.

In some embodiments, the amount of the first component is between about 10% w/w to about 50% w/w of the composite material.

The first component may also include plastic. The amount of plastic in the first component may be from null to about 40% w/w, or to about 35% w/w or even to about 30% w/w. In some embodiments, the amount of plastic in the composite material is at least 1% w/w, 3% w/w, 5% w/w, 10% w/w or even 15% w/w but not more than 30% w/w or 25% w/w or even not more than 20% w/w. Some non-limiting examples of plastic material that may form part of the first component and thus of the composite material include synthetic polyolefins (e.g. high density polyethylene (HDPE), low density polyethylene (LDPE), linear low density polyethylene (LLPE), polypropylene (PP)); polystyrene (PS) (including high impact polystyrene, HIPS), rigid and plasticized polyvinylchloride (PVC), ABS (acrylonitrile butadiene styrene), PU (polyurethane), polyamides (PA), and ethylene vinyl alcohol copolymers (EVOH).

According to some embodiments the first component also comprises an inorganic element such as metal, sand and clay. The amount of the inorganic element may range from at least about 1% w/w, about 2% w/w, about 5% w/w, about 10% w/w or at least about 15% w/w of inorganic matter; but less than about 50% w/w, about 40% w/w, about 30% w/w or even less than about 20% w/w in the composite material.

In some embodiments, the first component is derived from substantially unsorted waste (SUW). In yet some more specific embodiments, the unsorted waste is municipal solid waste (MSW). While the different elements of the first component, i.e. the organic element, the thermoplastic element etc. may originate from the same source, e.g. the same bulk of SUW/MSW, it may at times, be provided from different sources. For example, the organic element may be provided from garden cuttings and/or organic domestic waste, the thermoplastic element may be from collected plastic bottles and containers.

The second component comprises at least one element selected from vulcanized rubber and tire cords. In some embodiment, the amount of the second component out of the combined first component and second component is in the range from at least about 50% w/w, about 55% w/w, about 60% w/w, about 65% w/w, about 70% w/w, about 75% w/w, about 80% w/w or at least about 85% w/w of the total weight of the composite material to an upper limit of less than about 90% w/w, about 85% w/w, about 80% w/w, about 75% w/w, about 70% w/w about 65% w/w or less then about 60% w/w of the total weight of the combined first component and second component.

In some embodiment, the amount by weight of vulcanized rubber out of the total combined first component and second component is in the range from at least about 20%, about 25%, about 30%, about 35%, about 40%, about 45%, about 50% or at least about 55% of the total weight to an upper limit of less than about 90% (when no tire cords are present), about 85% (when tire cords may also be present), about 80%, about 75%, about 70% about 65 or less then about 60% of the total weight.

In some embodiment, the amount of tire cords by weight out of the total combined first and second components is in the range from at least about null, about 1%, about 2%, about 5%, about 10%, about 15%, about 20% or at least about 25% to an upper limit of less than about 30%, about 25%, about 20%, about 15%, about 10% about 5% or less then about 3%.

For the sake of clarity, as some tire cords are also considered to be plastic material (e.g. polyamide and polyester), it is to be understood that polymers in the form of cords being suitable for use as tire cords are calculated as being tire cords only and not as part of the thermoplastic element in the first component. Similarly, plastic material that is not in the form of cords that are suitable for use as tire cords are calculated here as part of the thermoplastic element in the first component.

Typically, the total weight of the combined first component and of the second component is the total weight of the composite material.

In one embodiment, the second component at least comprises vulcanized rubber. Without being limited thereto, the addition of tire cords may assist in increasing the mechanical strength of the resulting composite material. The length of the tire cords used also has an effect on the strength of the resulting composite material: the longer the fiber, the stronger the resulting material. The increased mechanical strength enables the use of the composite material various applications where resilient materials are usually utilized.

At times, the composition, and as a result the properties of the composite material, may be fine-tuned by adding certain other elements either during the preparation thereof or after it is formed.

Some non-limiting examples for other elements that may be beneficial to incorporate into the composite material are color pigments and active carbon.

According to some embodiments the first component is processed waste comprising at least organic waste and thermoplastic waste. The term "processed waste" refers to waste that was subjected to at least one manipulation of drying, mixing while heating under shear forces, extruding, and optionally also particulating and sieving. At times the processing of the waste to obtain the first component may comprise all of aforementioned actions. The processed waste is obtained, in some embodiments as particulate material in the size range of between about 0.01 mm and about 2.5 mm in diameter, but may be at times smaller than about 1.5 mm, even more typically particles having a size of between about 0.7 mm and about 1.5 mm or smaller than about 0.7 mm in diameter are used. According to one embodiment, the first component is particulate processed waste having a size range of between 0.01 mm and 0.7 mm in diameter.

According to some embodiments, the waste is substantially unsorted waste (SUW) which may provide a processed waste as described in co-pending PCT/IL2010/000027. This processed waste is prepared by processing substantially unsorted waste using the following minimal steps of particulating substantially unsorted waste that comprises organic matter and optionally plastics and heating while mixing the particulate waste material to a temperature of at least about 100□C under shear forces to thereby obtain the processed waste. The unsorted waste may be dried prior to processing.

The processed waste used, at times, as a first component may be characterized by its surface energy. According to one embodiment of the invention, the processed waste obtained from SUW has a surface energy that is above about 35 dyne/cm, preferably above about 40 dyne/cm and even more preferably above 45 dyne/cm. For the sake of comparison, the surface energy of polyethylene is about 35 dyne/cm and of polypropylene is about 31 dyne/cm, and of Polytetrafluoroethylene (PTFE/Teflon) 18-20 dyne/cm. The processed SUW has thus a high surface energy, and in fact the processed SUW has a surface energy that is higher than polyolefins. This relatively high surface energy permits strong interaction at its surface with other polar substances, such as paint, adhesives, wood, various stones and others, e.g. upon processing with the second component to form the composite material of the invention.

Further characteristics of the first component of the invention, when using processed unsorted waste, include,
  a density above about 1.2 g/cm3, typically in the range of 1.2-1.7 g/cm3.
  tensile modulus of elasticity above about 600 MPa (also referred to at times by the terms elastic modules or tensile modulus). The tensile modulus of elasticity is generally defined by a material's resistance to be deformed elastically (i.e. non-permanently) when a force is applied to it. The higher the force required, the stiffer the material is.
  Tensile strength above about 5 MPa, 6 MPa, 7 MPa and even above 8 MPa, namely, the stress at which a material fails or permanently deforms under tension;
  Flexural strength above about 7 MPa, above about 9 MPa and even at about 11 MPa (also referred to at times by the term bend strength), namely, the stress applied to a material at its moment of rupture.
  Flexural modulus above about 2,000 MPa, above about 3,000 MPa, and even about 3,500 MPa which refers to the material's stiffness in flexure, namely, its resistance to deformation by an applied force.

Impact strength above about 12 J/m, above about 13 J/m, 15 J/m and even of above about 17 J/m (notched Izod impact), which refers to the ability of a material to withstand shock loading.

Charpy Impact above about 1.5 KJ/m2, 1.6 KJ/m2, 1.7 KJ/m2, or even 1.8 KJ/m2 (Charpy Un-notched test) which refers to the energy per unit area required to break a test specimen under flexural impact.

In some embodiments, the composite material is comprised of 10-50% w/w of a first component, 20-90% w/w vulcanized rubber, and 0-30% w/w tire fibers, wherein the combined amount of vulcanized rubber and tire fibers is between 50 to 90% w/w. According to another embodiment the composite material also comprises up to 12%, typically up to 10% w/w volatile liquids (i.e. liquids having a vapor pressure of at least 15 mmHg at 20 □C, e.g. water and ethanol).

According to one embodiment, the vulcanized rubber comprises tire crumb.

The composite material may further comprise fillers and other additives that are customary in article manufacturing such as absorbents, plasticizers, binders, carbon black, UV blockers, metals, weight additives, sand, silica and pigments. The combined amount of these additives typically does not exceed more than 10%, or not more than 5% and even not more than 2% wt of the total weight of the composite material.

In yet some other embodiments, the composite material comprises as much as 90%, 85%, 80%, 75%, 70%, 65%, 60%, 55%, or 50% crumb rubber, 50%, 45%, 40%, 35%, 30%, 25%, 20%, 15%, or 10% of the first component; 40%, 35%, 30%, 25%, 20%, 15%, or 10% cords and up to 10, 9, 8, 7, 6, 5, 4, 3, 2, 1% volatile liquids (e.g. water) by weight.

According to one embodiment, the minimal amounts of crumb rubber and of the first component are 50% and 10% by weight, respectively.

According to one embodiment, the composite material comprises organic element, thermoplastic element and the second component consists of vulcanized rubber. According to yet another embodiment the composite material comprises organic element, thermoplastic element and the second component consists of tire fibers.

Properties of the Composite Material

The composite material exhibits some thermoplastic behavior that may be characterized by the following parameters (properties):

Charpy impact ranging from at least about 6.7 KJ/m2 to at most about 17.5 KJ/m2 (determined by ISO 179 on a Ray-Ran tester), maximum tensile strength ranging from at least about 1.3 MPa to at most about 4.5 MPa (determined by ISO 527-1-2 on a M350-10KN (Testometric) tester), modulus of elasticity ranging from at least about 85 MPa to at most about 740 MPa (determined by ISO 527-1-2 on a M350-10KN (Testometric) tester), elongation at brake ranging from at least about 2.0% to at most about 9.4% determined by ISO 527-1-2 on a M350-10KN (Testometric) tester, flexural strength ranging from at least about 2 MPa to at most about 9.4 MPa (determined by ISO 178 on a M350-10KN (Testometric) tester), and flexural modulus ranging from at least 341 MPa to at most about 771 MPa (determined by ISO 178 on a M350-10KN (Testometric) tester).

The composite material was also found to be injectable, e.g. when heated, may be subjected to injection molding.

Further, the composite material is found to hold tire-derived pollutants, such as aromatic hydrocarbons, (PAHs) and certain metals such as iron, arsenic, cadmium, chromium, manganese, intact in the composite material and thus minimize or eliminate environmental hazards associates with disposal of tire waste. The holding of polluting substances may be determined by leaching testes, such as described by procedures such as EPA SLO-846 method 1310 and as compared to leaching of the second component according to the invention without being combined with the first component as described herein.

Other properties that can define the composite material include:
density;
melting & softening point;
low temperature flexibility;
spiral flow;
hardness (Shore A);
elemental analysis;
leaching in water, brine and sea water;
tensile at break;
elongation;
modulus at 100%;
heat deflection temperature;
creep resistance; flexural modulus
Charpy Impact;
thermal, electrical, acoustical conductivity; and
aging (UV, soil burial, brine water, ozone etc.).

Method of Preparation

The present disclosure also provides a process comprising:
mixing while heating under shear forces a first component comprising organic waste and thermoplastic waste and a second component comprising at least one element selected from the group consisting of vulcanized rubber and tire fibers to obtain a melt;
processing the melt, the processing comprises at least cooling the melt to obtain a composite material comprising:
organic element;
thermoplastic element; and
at least one element selected from the group consisting of vulcanized rubber and tire fibers.

Within the same aspect there is also provided a process comprising:
subjecting at least organic waste and thermoplastic waste to at least one processing step selected from the group consisting of drying, particulating, mixing and heating under shear forces, to obtain a first component;
mixing while heating under shear forces the first component with a second component comprising an element selected from the group consisting of vulcanized rubber and tire cords, to obtain a melt; and
processing the melt, where the processing comprises at least cooling to obtain a composite material comprising:
organic element;
thermoplastic element; and
at least one additional element selected from the group consisting of vulcanized rubber and tire cords.

Yet, within this aspect of the invention, there is provided a process comprising:
mixing while heating under shear forces a first component comprising processed waste with a second component comprising at least one element selected from the group consisting of vulcanized rubber and tire cords to obtain a melt; and processing the melt, wherein the processing comprises at least cooling to obtain a composite material comprising:

organic element;

thermoplastic element; and at least one element selected from the group consisting of vulcanized rubber and tire cords In one embodiment, the first component is processed unsorted waste. The processed unsorted waste may be obtained by mixing and heating dried and particulated SUW, under shear forces and finally extruded as explained in detail in co-pending PCT/IL2010/000027, which is hereby incorporated by reference. In one embodiment, the processing of the SUW comprises at least one of particulating, drying, blending, sieving and mixing while heating, extruding the melt that is obtained after mixing while heating under shear forces, granulating and sieving. At times the processing of the SUW to obtain the first component may comprise all of aforementioned actions. The processed SUW is obtained, in some embodiments as particulate material.

A finding of the present process is that while heating for the purpose of recycling of vulcanized rubber requires high temperatures and high pressure, the composite material of the invention can be prepared at much lower temperatures and pressure than other recycling processes of vulcanized rubber. Thus the process of the invention may be regarded a more energy efficient process as compared to those used to recycle vulcanized rubber.

In some embodiments, the first component and the second component are mixed before mixing while heating under shear forces.

The amount of the first component and of the second component may vary. In some embodiments, the first component is in an amount between about 10% out of the total weight of the combined amount of the first component and second component (w/w) to about 50% w/w and the second component is in an amount of between about 50% w/w to about 90% w/w of the combined amount of the first component and the second component.

The first component comprises organic waste. The amount of the organic waste may be in a range from a lower % by weight of at least about 10% w/w of the total mixture, at times, about 15%, about 20%, about 25%, about 30%, about 35%, about 40% and even at least about 48% by weight out of the total weight of the combined first and second components to an upper % of up to about 49%, typically less than about 45%, about 40%, about 35% or even less than about 30% of organic matter by weight out of the total weight of the combined components.

The first component also comprises thermoplastic waste. In some embodiments, the amount of the thermoplastic waste is in a range from a lower at least 1%, 2%, 5% or even 10% by weight out of the total weight of the combined first and second components to an upper % of up to about 49%, typically less than about 45%, about 40%, about 35% or even less than about 30% of thermoplastic waste by weight out of the total weight.

The second component comprises at least one element selected from the group consisting of vulcanized rubber and tire cords. In one embodiment, the amount of the second component out of the total weight of the combined first and second components may range from at least about 50%, about 55%, about 60%, about 65%, about 70%, about 75%, about 80% or at least about 85% by weight of the total weight of the combined first and second components to an upper limit of less than about 90%, about 85%, about 80%, about 75%, about 70% about 65 or less then about 60% by weight of the total weight of the combined components.

The amount by weight of vulcanized rubber out of the total weight of the combined first and second component may range from at least about 20%, about 25%, about 30%, about 35%, about 40%, about 45%, about 50% or at least about 55% to an upper limit of less than about 90% (e.g. when no tire cords are present at all), about 85%, about 80%, about 75%, about 70% about 65 or less then about 60% of the total weight of the combined components.

When the second component comprises tire rubber and tire cords, the tire rubber is selected from the group consisting of tire slit, chipped tires, ground rubber and crumb rubber and the tire cords are selected from the group consisting of at least one of polyester, polyamide, polyvinyl alcohol and rayon.

In one embodiment, the heating under shear forces is at a temperature in the range of between about 100°C to about 200°C. In some embodiments, the temperature is at any range of between a lower end of 115°C, 120°C, or 125°C to an upper end of 160°C and 180°C.

The mixing while heating may be preceded with a pre-mixing (without heating) of the first component and the second component. In addition, at times, particulating may take place prior to mixing. For example, when the first component is processed unsorted waste, the latter may be particulated and sieved before it is mixed with the at least one of vulcanized rubber and tire fibers. In some embodiments, the first component particulate has a size range of between about 0.01 mm and about 2.5 mm in diameter, in some embodiments between 0.01 mm and about 0.7 mm, in some embodiments between about 0.7 mm and about 1.5 mm and in some embodiments between about 1.5 and about 2.5 Particulating may be met by grinding, shredding, slitting, dicing, crushing, crumbing, chopping by conventional size reduction processes, including, without being limited thereto, shredders, grinders, choppers, granulators, which, when necessary, may be equipped with blades, hammers or plates that are made of robust materials such as stainless steel or titanium.

Further, prior to mixing while heating, drying may take place. The drying may be of the first and/or second components as received, on particulated matter. Drying may be achieved by any means, e.g. by placing the waste outdoors and allowing it to dry, under a stream of dry air, in an oven chamber or by squeezing the liquid out. In one embodiment, the first component is SUW which is subjected to drying and particulating prior to mixing with the second component.

In some embodiments, prior to mixing while heating separating of elements of economical value may take place. Such elements may include, recyclable material or articles, such as batteries, aluminum and iron, glass, ceramics, paper, cardboard etc. The separation of such elements from the particulate matter may be executed by the use of suitable sieves, magnetic separators, eddy current separators, floatation systems, gravimetric separation techniques, etc. For example, loose steel cords may be separated from the shredded tires by means of passing the shredded tires upon a conveyor under a magnet or a series of magnets. Some amount of loose steel cords may still remain in the second component. It is estimated that vulcanized rubber may still about 0.1, 0.2, 0.5, 1, 2, 3, 4 or even up to 5% by wt of the total weight of the rubber forming the second component.

It is noted that the process disclosed herein does not require the removal of tire shreds and/or tire cords typically removed from tire recycling processes. In other words, the process disclosed herein allows recycling of these elements as well. Without being bound by theory, it is believed that the presence of the tire shreds and tire cords affects the mechanical properties of the resulting composite material.

The mixing may also involve the addition of at least one plastic material. Similarly, the mixing of the plastic material may be prior to, or during the mixing while heating under shear forces. In other words, the plastic may be added at a pre-mixing stage, as described above, or it may be added while heating and mixing. The plastic may be selected from the group consisting of polyethylene, polyvinylchloride, polystyrene, polyurethane, thermoplastic elastomers polypropylene and mixtures thereof. The amount of plastic added may be such to obtain in the melt an amount of thermoplastic material in a range of between 1% and 49%.

Further, various additional additives may be added either before or during the step of mixing while heating under shear forces, e.g. so as to impart certain desired properties to the resulting composite material. Examples of additives used as fillers may include, without being limited thereto, sand, minerals, recycled tire material, glass, wood chips, thermosetting materials, other thermoplastic polymers, gravel, metal, glass fibers and particles, etc. These fillers may originate from recycled products; however, virgin materials may also be employed. Other additives may be added to improve the appearance, properties, texture or scent of the composite material such as pigments, odor masking agents (e.g. activated carbon), oxidants (e.g. potassium permanganate) or antioxidants.

Further, curing agents may be added such as sulphur, peroxides prior to or during the heating while mixing. It is noted that the first and second component as well as any other additives may be introduced into the process simultaneously or sequentially, before, during and after the process. Also, the addition of the various elements may be in portions. For example, the compounder may receive first a portion of the first component, e.g. SUW, followed by the introduction of the second component, e.g. vulcanized rubber. Further, the compounder may include various inlets for introducing the various elements at different locations, thus, for example, allowing the introduction of one component after other components have already been subjected to some level of heating while mixing under shear forces.

The mixing while heating under shear forces may be performed in a compounder selected from the group consisting of extruder, internal mixer (Banbury), co-kneader, and continuous mixer. The mixing while heating using shear forces typically results in a homogenous melt/blend.

In some embodiments, the extruder comprises a heated barrel containing rotating therein a single or multiple screws. When more than a single screw is used, the screws may be co-rotated, counter-rotated planetary rotated (such as in a planetary roller extruder). Screws may be intermeshing, or non-intermeshing. The extrusion apparatus may be a single extruder or combinations of extruders (such as in tandem extrusion) which may be any one of the extruders known in the plastics industry, including, without being limited thereto, single screw extruder, tapered twin extruder, tapered twin single extruder, twin screw extruder, multi-screw extruder. One suitable type of extruder in the context of the invention is a single screw extruder. In some embodiments the extruder is equipped with a venting zone. In some other embodiments the extruder comprises a nozzle that is chilled during extrusion. In yet some other embodiments, the extruder may be segmented and configured so as to apply differential temperature and/or pressure as desired.

Sufficient shearing, mixing and residence time are generally required so as to allow the combined components to reach the required/desired temperature, which is determined by obtaining a composite material exhibiting the thermoplastic behavior. The desired material temperature can be reached by two ways: either by heat absorbed from the compounder or other device, or by friction caused by the shearing forces, or a combination of the two ways. It is typical to add heat to the process and not to rely solely on frictional heating caused by the shearing and mixing. Thus, according to one embodiment, the compounder is set to a temperature of between about 100° C. and 200° C., and at times to a temperature of between about 120° C. and 190° C., or even between about 140° C. and about 180° C. The temperature of the material (as measured by a thermocouple device, either internally or upon exit from the die) is usually higher than the machine set temperatures, due to heating caused by shearing forces.

It should be appreciated that under conditions of the process disclosed herein, namely, heating under shear forces at a temperature above 100° C., the resulting composite material may be regarded as sterile, namely, that pathogens contained in the components prior to the process, such as in the unsorted waste are destroyed.

The hot melt resulting from the mixing while heating is then cooled to ambient temperatures (e.g. room temperatures which are typically around 25° C.) to obtain the composite material.

In some embodiments, the composite material may be re-processed under the same or different conditions used for its formation. In one embodiment, the composite material is subjected to one or more cycles of heating under shear forces at the same conditions used for its production.

Preparation of Articles of Manufacture from Composite Material and Other Uses

In another aspect, there is also provided a process comprising providing a composite material as disclosed herein and subjecting the composite material to at least heating at a machine temperature of between 100° C. to 180° C. and at least one additional process step selected from the group consisting of extruding, molding, compression molding, whereby an article of manufacture is obtained, having a desired shape.

In accordance with some embodiments, the composite material may be reheated to a temperature in a range of between above about 100° C. above 130° C. and even above 140° C. an up to about 160° C., 180° C. or 200° C., at which it turns into soft, flowable matter. Additives and fillers as detailed above are also optionally added to the composite material.

Table 1 lists possible products (articles of manufacture) that can be prepared by processing the composite material disclosed herein, alongside parameters that are characterize the specified product.

TABLE 1

| articles of manufacture from composite material | |
|---|---|
| Application | Required parameter |
| Wheels and castors for Garbage Cans and Shopping pulleys | Dimensional stability, elasticity, resilience, wear and tear resistance, abrasion resistance, oil & detergents resistance |
| Sign Post Base Weight | wear and tear resistance, non-leaching, age resistance, standing in extreme weather condition, UV resistance |
| Transport (fork lift) pallet | Resilience, impact resistance, non-leaching |

TABLE 1-continued articles of manufacture from composite material

| Application | Required parameter |
|---|---|
| Road and traffic signs and protection | Age, weather and UV resistance, impact resistance |
| Acoustic insulation | Wear resistance, leaching, emissions |
| Floor padding and carpeting | wear and tear resistance, abrasion resistance elasticity and resilience, resistance to domestic substances, dimension stability |
| Ballistic and projectiles protection | Resilience, teat resistance, resistance to tear propagation |

In some embodiments, the composite material are used as an additive to manufacturing processes, to be added, for example, to a thermoplastic hot melt comprising virgin or recycled plastic.

The composite material of the invention is also used in variety of industrial processes, to form a variety of semi-finished or finished products. Non-limiting examples include building material, panels, boards, pallets, pots, component of plant growth substrate, and many others.

In such semi-finished or finished products, the composite material is the sole component or is in a mixture with other materials.

In some embodiments, the process comprises preparing an article comprising two or more materials adhered to one another to form laminates and the like, where at least one layer comprises the composite material. Such multi-layer structures may be obtained by lamination, co-calendering, co-compression, co-extrusion, co-injected or tandem extrusion of two or more materials (one being the composite material of the invention) so as to form the multi-layer product.

Further, the composite material is added in some embodiments as filler, for example, to be mixed with bitumen (asphalt), to yield a modified bitumen material, like polymer modified bitumen. The modified bitumen material may be used as a substitute for bitumen in the construction of roads, pavements, platforms, waterproofing membranes, polymeric asphalt and so forth. According to one embodiment the bitumen-like material is prepared by mixing the composite material with bitumen in a mixer. The composite material is mixed at any amount with the bitumen, from even 1% up to 95% of the mixed composite material/bitumen. In one embodiment, the bitumen like material is formed from about 90% composite material and in fact, the bitumen is used as an additive to the composite material. It has been found that the resulting bitumen like material is injectable and can be processed using an extruder.

DETAILED DESCRIPTION OF NON-LIMITING EXAMPLES

Example 1

Processing Equipment

In the following processes various devices and systems were employed. It is to be understood that while some of the devices were constructed by the inventor, all are based on conventional devices. These include a shredder, a single screw extruder, a compounder (Banbury), an injection molding machine, a compression molding press and any other machine in which the material undergoes shearing and/or heat, such as a granulator, pelletizing press, mill etc.

Two single screw extruders were employed in the following examples. The first is a self-designed extruder (screw diameter: 70 mm, screw length: 2650 mm, clearance of screw to barrel: 0.1 mm, die and adapter length 190 mm, die opening diameter: 10 mm) and the second is an Erema RM 120 TE (screw diameter: 120 mm, screw length: 4000 mm, clearance of screw to barrel: 0.1-0.2 mm, die and adapter length 370 mm, die opening diameter: 50 mm), both having a venting zone.

Example 2

Processing of SUW

An extrudate from SUW was prepared following the extrudate II process described in PCT/IL2010/000027 Substantially unsorted waste (SUW), collected from private households was shredded in a shredder (type ZSS 850 ex Zerma, China) equipped with steel blades and then ground in a granulator (granulator type GSH 500/600 ex Zerma, China) into particles of a size of between several microns to several centimeters. The ground particulates were then sieved to collect particulates in the range of 100-200 mm in diameter. The 100-200 mm particulates flow passes through a magnet that removes at least some of the original magnetic metallic content of the SUW. After separation of magnetic metals the remaining particulate flow is ground (granulator type GSH 500/600 ex Zerma, China) and sieved again to obtain particulates having an approximate size of 20 mm. The ground particulates were then air dried for a few days, dried under a stream of dry air, until at least some, but not all liquid was removed to obtain dried particulates. The dried particulates were fed into single screw extruder (Erema) that was set at a temperature of 180□C and a rotation rate of about 50 rpm. The particulated material was processed in the extruder with a residence time of between about 3 minutes to about 5 minutes. The extrudate was cooled to room temperature (herein "extrudate II"). Visual inspection of the extrudate suggested that it contains fibrous material as well as substances having a melting point higher than the process temperature (e.g. glass and metal). The extrudate was subsequently ground by a granulator (Zerma) and sieved to obtain particulates having an approximate size smaller than 0.7 mm in diameter. Larger particulates were reground and sieved again and so forth until substantially all of the SUW was particulated into particles smaller than 0.7 mm in diameter.

Example 3

Preparation of a SUW/Crumb Rubber 1:1 (Wt/Wt) Material

Crumb rubber made from discarded tire was obtained from a tire recycling plant (Tyrec), in a size range of between 0.3 and 5 mm divided to three size categories: under-0.5 mm, 0.5-2 mm, 2-4 mm. The tire shreds were obtained by cutting discarded tires in a cutter shredder (type BDR 2000 ex MTB, France). After shredding, tire cords were separated from the tire shreds. When necessary, the tires or the tire shreds were first dried before further processing with an air blower, reaching a moisture content of no more than 10% wt. The tire shreds were then passed on a conveyer under a magnet to separate loose steel cords.

Particulates of SUW extrudate that were obtained according to Example 2 and crumb rubber 1:1 (wt/wt) were mixed in a self mixer at 23 rpm to obtain a substantially homogeneous mixture. It should be noted that while the SUW and the crumb rubber were basically mixed homogenously, the tire cords tend to aggregate in bulks with the main matrix. The mixture was introduced into the home made single screw extruder described above which was set at a machine temperature of 180° C. and a screw rotation rate of 50 rpm having a temperature gradient from 110° C. to 180° C. for a residence time of about 3 minutes. The fumes from the venting zone were removed with a vent. The melt was transferred after cooling to a Demag, Ergotech Viva 80-400 injection machine (temperature: 150 □C, injection pressure: 40-90 bar, injection speed: 30-50 mm/s) or a 250 tones press to obtain injection molding or compression molding articles, respectively. Evidently, the mixing of SUW extrudate with the crumb rubber allowed the injection molding and extrusion of vulcanized rubber as if it were a thermoplastic material.

Example 4

Preparation of a SUW/Crumb Rubber/Tire Cords 4:5:1 (Wt/Wt) Material

Crumb rubber and SUW were obtained as detailed in Example 3. Tire cords were obtained from a tire recycling plant (Tyrec). The tire cords comprise nylon (polyamide 6 and polyamide 6,6), rayon and polyester.

SUW, crumb rubber and tire cords 4:5:1 (wt/wt) were mixed in a self mixer at 23 rpm to obtain a substantially homogeneous mixture. It should be noted that while the SUW and the crumb rubber were basically mixed homogenously, the tire cords tend to aggregate in bulks with the main matrix. The mixture was introduced into the home made single screw extruder described above which was set at a machine temperature of 180° C. and a screw rotation rate of 50 rpm having a temperature gradient from 110° C. to 180° C. for a residence time of about 3 minutes. The fumes from the venting zone were removed with a vent. The melt was transferred after cooling to a Demag, Ergotech Viva 80-400 injection machine (temperature: 150 □C, injection pressure: 40-90 bar, injection speed: 30-50 mm/s) or a 250 tones press to obtain injection molding or compression molding articles, respectively. Evidently, the mixing of SUW extrudate with the crumb rubber allowed the injection molding and extrusion of vulcanized rubber as if it were a thermoplastic material.

Example 5

Preparation of a SUW/Crumb Rubber/Tire Cords 4:5:1 (Wt/Wt) Material

Crumb rubber and SUW were obtained as detailed in Example 3. Tire cords equivalents were obtained from discarded carpets. The discarded carpets comprise nylon (polyamide 6 and polyamide 6,6) and polyester fibers.

SUW, crumb rubber and tire cords 4:5:1 (wt/wt) were mixed in a self mixer at 23 rpm to obtain a substantially homogeneous mixture. It should be noted that while the SUW and the crumb rubber were basically mixed homogenously, the tire cords tend to aggregate in bulks with the main matrix. The mixture was introduced into the home made single screw extruder described above which was set at a machine temperature of 180° C. and a screw rotation rate of 50 rpm having a temperature gradient from 110° C. to 180° C. for a residence time of about 3 minutes. The fumes from the venting zone were removed with a vent. The melt was transferred after cooling to a Demag, Ergotech Viva 80-400 injection machine (temperature: 150 □C, injection pressure: 40-90 bar, injection speed: 30-50 mm/s) or a 250 tones press to obtain injection molding or compression molding articles, respectively. Evidently, the mixing of SUW extrudate with the crumb rubber allowed the injection molding and extrusion of vulcanized rubber as if it were a thermoplastic material.

Example 6

Mechanical Properties of SUW/Crumb Rubber/Tire Cords Wt:Wt Material

Mechanical properties of injection molding products made from the composition were determined following ISO standards. The products were prepared according to Example 4 except for making the necessary modifications in the components ratios. The results are presented in Table 2. For the sake of comparison the mechanical properties of neat SUW extrudate, that was taken from the same batch which was mixed with the rubber. Tensile strength, elongation at break, Young's modulus were determined according to the ISO 527-2-1 standard and flexural strength and flexural modulus were determined following the ISO 178 standard, all using a Testometric M350-10KN universal materials testing machine. Charpy impact was determined according to the ISO 179 standard on a Ray-Ran Advanced Pendulum Impact Tester.

TABLE 2

Mechanical properties of samples made by injection moldings as determined by ISO standards

| SUW/Rubber crumb/cords (wt:wt) | Charpy Impact (KJ/m2) | Max. Tensile Strength (MPa) | Modulus of Elasticity (MPa) | Elongation at Break (%) | Flexural Strength (MPa) | Flexural Modulus (MPa) |
|---|---|---|---|---|---|---|
| 1:0:0 | 1.72 | 4.00 | 702.3 | 0.42 | 2.55 | 53.06 |
| 5:5:0 | 37.01 | 5.34 | 224.75 | 15.38 | 5.98 | 198.33 |
| 3:7:0 | 17.51 | 1.3 | 85.7 | 8.6 | 2.0 | 427.5 |
| 4:6:0 | 13.85 | 1.7 | 233.1 | 4.7 | 3.3 | 379.1 |
| 5:5:0 | 9.05 | 2.2 | 607.3 | 2.1 | 4.4 | 771.6 |
| 4:5:1 | 8.53 | 4.3 | 627.3 | 2.8 | 8.7 | 526.2 |

It is evident from the mechanical properties presented in Table 2 that the mixing of SUW with rubber renders increased elasticity and increased toughness in comparison with the neat SUW extrudate.

Example 7: Mechanical Properties of SUW/(Rubber Crumb)/(Tire Cords) Compositions with Added Polypropylene (PP)

In order to test the effect of increased content of plastic in the composition beyond the statistical plastic distribution in MSW (about 13%) PP was added to the mixture of the two components (the processed SUW and the tire waste source). The composition and the injection molding samples were prepared as described in Example 3 with the exception of making the necessary changes in the components proportions. Mechanical properties of the injection molding products were determined following ISO standards. The results are presented in Table 3.

TABLE 3

Mechanical Properties of samples made by injection molding of the composition comprising polypropylene (PP)

| SUW/crumb/ cords/PP (w/w) | Charpy Impact (KJ/m2) | Max. Tensile Strength (MPa) | Modulus of Elasticity (MPa) | Elongation at Break (%) | Flexural Strength (MPa) | Flexural Modulus (MPa) |
|---|---|---|---|---|---|---|
| 30:50:0:20 | 7.92 | 4.5 | 741.4 | 2.4 | 9.4 | 653.6 |
| 25:50:10:15 | 8.66 | 3.8 | 578.5 | 2.7 | 7.5 | 423.3 |

Example 8

Mechanical Properties of Compositions of the Invention Comprising Additives

The effect of additives on the mechanical properties of composition according to this invention was also tested. To this end, compositions comprising an odor absorbent (active carbon) and/or a coupling agent (CA, Bondyram® 7100 purchased from Polyram, Israel) were prepared according to the procedure described in Examples 3 and 4. The additives were added to the mixture of the processed SUW and the second component (tire powder and/or tire cords). The results are summarized in tables 4 and 5.

TABLE 4

Mechanical properties of samples made by injection molding of composite material comprising 2% coupling agent additives (the mechanical properties of the closest composition without the additive is presented in parentheses).

| SUW/crumb/ cords/PP (w/w) | Charpy Impact (KJ/m2) | Max. Tensile Strength (MPa) | Modulus of Elasticity (MPa) | Elongation at Break (%) | Flexural Strength (MPa) | Flexural Modulus (MPa) |
|---|---|---|---|---|---|---|
| 28:50:0:20 | 8.53 | 4.3 | 627.3 | 2.8 | 8.7 | 526.2 |
|  | (7.92) | (4.5) | (741.4) | (2.4) | (9.4) | (653.6) |
| 23:50:10:15 | 9.95 | 3.8 | 520.2 | 3.3 | 5.2 | 397.4 |
|  | (8.66) | (3.8) | (578.5) | (2.7) | (7.5) | (423.3) |
| 48:50:0:0 | 10.72 | 1.9 | 268.7 | 3.9 | 4.4 | 341.0 |
|  | (9.05) | (2.2) | (607.3) | (2.1) | (4.4) | (771.6) |
| 38:50:10:0 | 13.52 | 1.9 | 267.9 | 3.9 | 4.1 | 603.5 |
|  | (9.4) | (1.8) | (370.4) | (2.1) | (4.6) | (409.0) |

TABLE 5

Mechanical properties of compositions of the invention comprising 3% active carbon and 2% coupling agent (the mechanical properties of the closest composition without additives is presented in parentheses for sake of comparison).

| SUW/crumb/ cords/PP (w/w) | Charpy Impact (KJ/m2) | Max. Tensile Strength (MPa) | Modulus of Elasticity (MPa) | Elongation at Break (%) | Flexural Strength (MPa) | Flexural Modulus (MPa) |
|---|---|---|---|---|---|---|
| 35:50:10:0 | 10.23 | 1.9 | 343.8 | 3.0 | 3.7 | 359.2 |
|  | (9.4) | (1.8) | (370.4) | (2.1) | (4.6) | (409.0) |
| 25:50:0:20 | 7.37 | 4.1 | 708.8 | 2.7 | 8.4 | 650.3 |
|  | (7.92) | (4.5) | (741.4) | (2.4) | (9.4) | (653.6) |

Example 9

Other Mechanical Properties of SUW/Crumb Rubber 1:1 wt/wt Material

The products exhibit improved resistance to degradation relative to the corresponding rubber products. There are several methods to determine resistance to degradation which may be caused by various factors such as thermal oxidation, UV radiation, salt water, acid rain, and so on. The tests are performed according to a standard analysis protocol for deterioration of rubber. For example, dynamic determination of ozone degradation may follow the JIS K6259 protocol, surface cracking, and surface ozone cracking in a chamber, surface ozone cracking outdoors or in chamber, dynamic ozone cracking in a chamber may follow the ASTM standards D518, D1149, D1171 and D 3395, respectively. These standards address material testing and exposure to ozone, either in a chamber (indoor) or outdoors, as well as with static and dynamic test conditions. Other tests include progressive stress accelerated life test (PS-ALT),

Example 10

Use of SUW/Rubber/Tire Cords as a Binder in a the Preparation of Bitumen

A composition of SUW/rubber/tire cords 40:50:10% wt is mixed in a mixer with 10% wt bitumen at a mixing rate of 23 rpm and at a temperature of 25° C. until the mixture seemed to be homogeneous. The obtained bitumen is a softer product in comparison to a product made without the bitumen. The mechanical properties of the product (e.g. Charpy impact, max. tensile strength, modulus of elasticity, elongation at break, flexural strength, and flexural modulus) are tested according to standard analysis protocols.

The invention claimed is:

1. A plastic composition consisting essentially of:
   (i) a first component comprising a non-plastic organic element and a thermoplastic element; and
   (ii) a second component comprising cross-linked hydrocarbon elastomers;
   wherein the amount of the cross-linked hydrocarbon elastomers is at least 40% w/w of the plastic composition;
   wherein the amount of the thermoplastic element is from 1% w/w to 40% w/w of the plastic composition;
   wherein the remainder comprises the non-plastic organic element;
   wherein the thermoplastic element of the first component is selected from at least one polyolefin;
   wherein the plastic composition has thermoplastic properties and a modulus of elasticity of at least 80 MPa, determined on a M350-10KN (Testometric) tester in accordance with ISO 527-1-2; and
   wherein the first component has a density of at least 1.2 g/cm$^3$.

2. The plastic composition of claim 1, wherein the amount of the first component is from 10% w/w to 50% w/w of the plastic composition.

3. The plastic composition of claim 1, wherein the amount of the cross-linked hydrocarbon elastomers is from 45% w/w to 90% w/w of the plastic composition.

4. The plastic composition of claim 1, wherein the amount of the second component is not more than 90% w/w of the plastic composition, the amount of the cross-linked hydrocarbons elastomers is at least 40% w/w and not more than 89% w/w of the plastic composition, and wherein the second component further comprises tire cords in the amount of not more than 30% w/w of the plastic composition.

5. The plastic composition of claim 4, wherein the amount of the tire cords is from 1 w/w to 30% w/w.

6. The plastic composition of claim 1, having at least one of the following properties:
   Charpy impact of at least 7 KJ/m2,
   maximum tensile strength of at least 1.3 MPa,
   elongation at brake of at least 2%,
   flexural strength of at least 2 MPa, and
   flexural modulus of at least 300 MPa.

* * * * *